United States Patent [19]
Kimizuka et al.

[11] Patent Number: 4,785,181
[45] Date of Patent: Nov. 15, 1988

[54] MEASURING DEVICE FOR DETERMINING EXTENT AND DIRECTION OF RELATIVE MOVEMENT BETWEEN TWO OBJECTS HAVING MODULATION SECTION

[75] Inventors: Norio Kimizuka; Mituyosi Abo, both of Mobara, Japan

[73] Assignee: Futaba Denshi Kogyo Kabushiki Kaisha, Mobara, Japan

[21] Appl. No.: 936,327

[22] Filed: Dec. 1, 1986

[30] Foreign Application Priority Data
Dec. 4, 1985 [JP] Japan .................. 60-273857

[51] Int. Cl.$^4$ ............................... H01J 3/14
[52] U.S. Cl. ................. 250/237 G; 356/374; 356/375
[58] Field of Search .............. 33/125 A, 125 C; 250/237 G, 231 SE; 356/373–375, 395; 340/347 P

[56] References Cited
U.S. PATENT DOCUMENTS

| 4,472,629 | 9/1984 | Ort ................................. 250/237 G |
| 4,580,046 | 4/1986 | Sasaki et al. ................. 250/237 G |
| 4,629,886 | 12/1986 | Akyama et al. ............... 250/237 G |
| 4,636,079 | 1/1987 | Rieder et al. ................. 250/237 G |
| 4,638,421 | 1/1987 | Kimizuka et al. .................. 364/167 |

Primary Examiner—Edward P. Westin
Assistant Examiner—Khaled Shami
Attorney, Agent, or Firm—Oblon, Fisher, Spivak, McClelland & Maier

[57] ABSTRACT

A measuring device is disclosed which is capable of exhibiting increased resolution. The device is constructed to detect a moire fringe produced by two scales as A and B phase signals different in phase by 90° and to convert each of the phase signals into a frequency-modulated signal by means of a carrier of a predetermined cycle to digitally read out the deviation of a phase varied with relative movement between both scales.

5 Claims, 6 Drawing Sheets

MEASURING DEVICE FOR DETERMINING EXTENT AND DIRECTION OF RELATIVE MOVEMENT BETWEEN TWO OBJECTS HAVING MODULATION SECTION

BACKGROUND OF THE INVENTION

1. Field of the Invention

This invention relates to a measuring device for measuring relative movement between two objects, and more particularly to such a measuring device which is adapted to accomplish an improvement in resolution.

2. Description of the Prior Art

In a machine tool or the like, accurate measuring of relative movement of a tool to a work which is an object to be worked is highly important to the precision working of the work. Likewise, in an industrial recorder or the like, accurate measuring of relative movement between a record medium and a record head is required to accurately control movement of the record head to the record medium depending upon an input signal.

In order to meet such a demand, various systems for measuring movement between two objects relatively moved to each other have been proposed and put to practice.

One of such systems proposed is a measuring device which utilizes a moire fringe formed by two optical lattices superposed. More particularly, the measuring device, as shown in FIG. 7, is so constructed that a main scale 101 including an optical lattice 102 comprising transmission portions and nontransmission portions alternately arranged at a predetermined pitch and an index scale 103 formed with an optical lattice 104 of the same pitch which are positioned opposite to each other in such a manner that a microinterval is defined therebetween and both optical lattices are crossed to each other at a microangle. Also, the measuring device includes a light source 105 arranged on one side thereof and a photocell 106 arranged on the other side thereof in a manner to interpose both scales 101 and 103 therebetween. The irradiation of light from the light source 105 to both scales 101 and 103 forms a moire fringe, which is then detected by the photocell 106.

In the measuring device described above, relative movement between both scales 101 and 102 causes the moire fringe itself to be moved as well. Also, the direction of movement of the moire fringe is varied depending upon the direction of relative movement between both scales 101 and 102. The device utilizes such phenomena as described to read the moire fringe at positions different in phase by 90 degrees from each other to count the direction and amount of movement of the moire fringe, to thereby detect relative movement between both scales 101 and 103. Two signals obtained due to the reading are referred herein to as "A phase signal" and "B phase signal", respectively. More particularly, as shown in FIG. 8, the A phase signal and B phase signal obtained from the photocell 106 are supplied to amplifiers 107A and 107B, and supplied to wave shaping circuits 108A and 108B for waveform shaping, respectively. Then, the signals are introduced into a direction discriminating circuit 109, which then detects the direction of movement of the moire fringe and alternatively generates an upcount pulse UP when the moire is moved in a right direction and a downcount pulse DOWN when it is in a left direction. The so-generated pulse UP or DOWN is counted in a counter 110.

Further, other conventional measuring systems include a system using a magnetic lattice, an electromagnetic induction type system and the like.

An improvement in resolution in the above-described measuring device using the optical scales is generally accomplished by narrowing the pitch of each of the optical lattices 102 and 104.

However, the reduction of the pitch has its limit. For example, even photoetching techniques limit the reduction to as small as several microns.

In view of the foregoing, an increase in resolution of such a measuring device has been performed according to a so-called interpolation method which carries out addition or subtraction between the A phase signal and the B phase signal to produce a multi-phase signal. The interpolation method divides the pitch of the moire fringe into 8 or 16 parts to improve resolution.

However, basically the interpolation method divides a voltage level of each of the A and B phase signals at each phase, so that the number of divisions is subject to restriction. More specifically, it is substantially impossible to divide a level of each of the A and B phase signals having a crest value of about 1-2V into, for example, 100 parts for discrimination.

Recently, it has been desired to provide various kinds of industrial machines with a satisfied measuring capability so that they may exhibit higher accuracy. For example, it has been demanded that a measuring device to be installed in such machines has a capability of exhibiting resolution of as small as 0.1 $\mu$m or generating one upcount or downcount pulse when relative movement between both scales 101 and 103 is carried out by a distance of 0.1 $\mu$m. Unfortunately, a method of reducing or narrowing a pitch of an optical lattice and an electrical interpolation method as described above fail to provide a scale of a level sufficiently practical to meet such requirements.

SUMMARY OF THE INVENTION

The present invention has been made in view of the foregoing disadvantage of the prior art.

Accordingly, it is an object of the present invention to provide a measuring device which is capable of exhibiting increased resolution by detecting a moire fringe produced by two scales as A and B phase signals different in phase by 90° from each other and converting each of the A and B phase signals into a frequency-modulated signal by means of a carrier of a predetermined cycle to digitally read out the deviation of a phase varied with the relative movement between the scales.

In accordance with the present invention, there is provided a measuring device comprising a reference clock generating section having a frequency much higher than A and B phase signals; a modulation and addition section for modulating an output of the reference clock generating section or a signal obtained by dividing the output as a carrier by means of each of the A and B phase signals and carrying out addition of said output; a counter section for removing a higher harmonic component from the modulated signal to carry out waveform shaping of the signal and counting the number of reference clocks contained in one cycle of the shaped signal; and a comparator for comparing a result of counting by the counter section with the number of reference clocks obtained at the time of stopping of two scales to detect the direction and distance of relative movement between both scales.

Where a pitch of a moire fringe produced when the two scales each formed with an optical lattice of an equal pitch are opposite to each other at a microangle is indicated at P and relative movement (hereinafter referred also to as "deviation") between both scales is indicated at x, the A and B phase signals each having an amplitude $e_0$ are represented as follows:

$$A = e_0 \sin(2\pi \cdot x/P) \quad (1)$$

$$B = e_0 \cos(2\pi \cdot x/P) \quad (2)$$

A modulated signal S obtained by subjecting the A and B phase signals to balanced modulation by means of carriers $e_1 \sin wt$ and $e_1 \cos wt$, respectively, and adding them is represented as follows:

$$\begin{aligned}
S &= e_0 e_1 \sin(2\pi \cdot x/P)\sin\omega t + e_0 e_1 \cos(2\pi \cdot x/P)\cos\omega t \quad (3)\\
&= e_0 e_1/2 \{\cos(\omega t - 2\pi \cdot x/P) - \cos(\omega t + 2\pi \cdot x/P) + \\
&\quad \cos(\omega t - 2\pi \cdot x/P) + \cos(\omega t + 2\pi \cdot x/P)\}\\
&= K\cos(\omega t - 2\pi \cdot x/P)
\end{aligned}$$

wherein $K = e_0 e_1/2$.

More particularly, when the A and B phase signals are subjected to balanced modulation by means of carriers having an angular frequency of $\omega t$ and addition, the deviation x constitutes a phase component of the modulated signal S to deviate the phase of the modulated wave represented by the equation (3) depending upon the deviation x.

Supposing that a reference clock having a frequency $f_0$ is subjected to 1/N division to prepare a carrier, N reference clock are contained in one cycle of the carrier. Accordingly, when the deviation x is 0, the phase component in the equation (3) is 0, so that the number of clocks contained in one cycle of the modulated signal S is N.

However, relative movement between both scales causes the phase component in the equation (3) not to be 0, resulting in the phase of the modulated signal S being deviated. In this instance, the direction of movement of the moire fringe is varied depending upon the direction of relative movement between both scales, as described hereinbefore in connection with the prior art. Accordingly, a value of the phase component $2\pi \cdot x/P$ in the equation (3) is positive or negative depending upon the relative movement direction between the scales.

Supposing that the counted number of reference clocks contained in one cycle of the modulated signal represented by the equation (3) is $(N \pm \alpha)$, the deviation x can be known by counting $\pm\alpha$ reference clocks.

More particularly, when both scales are moved relative to each other to cause the deviation x to be equal to the pitch P of the moire fringe, this means that the phase component $2\pi \cdot x/P$ in the equation (3) is deviated by $2\pi$ (one cycle). During the one cycle, N reference clocks are generated, so that the deviation per one reference clock is P/N. Accordingly, the deviation x is represented by counting the number of deviations of reference clocks $\pm\alpha$ from N reference clocks per one cycle of the modulated signal, as follows:

$$x = \pm P/N \quad (4)$$

Thus, the present invention is to carry out modulation and addition of the A and B phase signals obtained from the scale sections to subject the carriers to a kind of frequency modulation, to thereby take out a data on relative movement between both scales in the form of the phase component of the modulated wave. In this instance, resolution of the measuring is determined depending upon a ratio of dividing of the reference clock.

Accordingly, the measuring of high resolution is accomplished by increasing the dividing ratio.

Also, the present invention is adapted to compare the number of deviations of reference clocks $\pm\alpha$ with N reference clocks in the case of the deviation x being 0 to count the difference. Thus, the digital treatment of $\pm\alpha$ causes the measuring to be carried out with more accuracy.

BRIEF DESCRIPTION OF THE DRAWINGS

These and other objects and many of the attendant advantages of the present invention will be readily appreciated as the same becomes better understood by reference to the following detailed description when considered in connection with the accompanying drawings in which like reference characters designate like or corresponding parts throughout, wherein.

DETAILED DESCRIPTION OF THE PREFERRED EMBODIMENT

Now, a measuring device according to the present invention will be described hereinafter with reference to the drawings.

Figure 1:
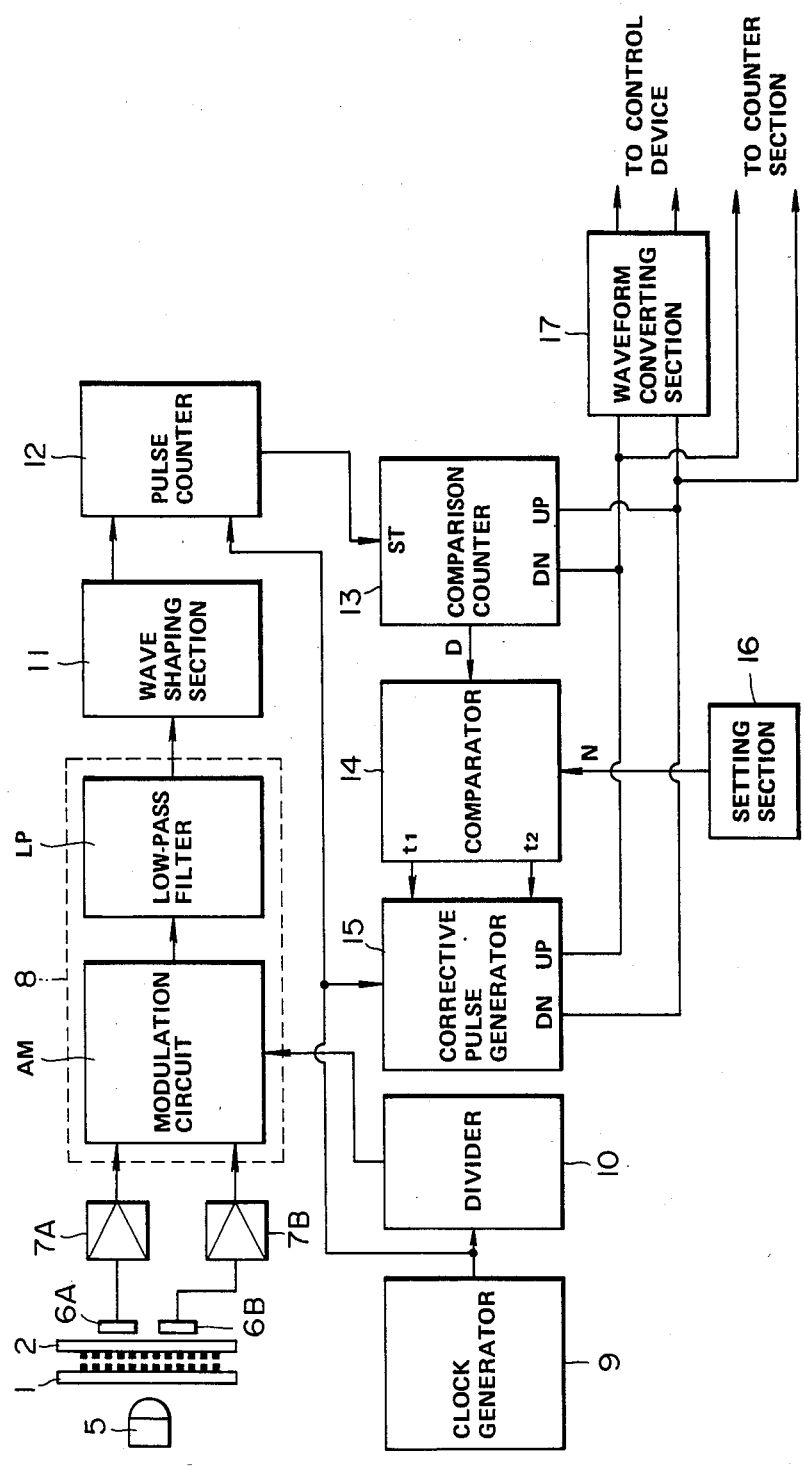
FIG. 1 is a block diagram showing an embodiment of a measuring device according to the present invention.

FIG. 1 is a block diagram showing a general construction of an embodiment of the present invention.

A measuring device of the illustrated embodiment includes a scale section comprising a main scale 1 and an index scale 2 each formed with an optical lattice of the same pitch. Also, the device includes a light source 5 and photoelectric transfer means 6A and 6B such as photocells or the like which are arranged to interpose the scales 1 and 2 therebetween. An A phase signal and a B phase signal are taken out from the photoelectric transfer means 6A and 6B and amplified by amplifiers 7A and 7B, respectively.

The amplified A and B phase signals are supplied to a modulation and addition section 8.

The modulation and addition section 8 constitutes a feature of the present invention and is supplied thereto an output of a carrier generating section comprising a clock generator 9 and a divider 10 is supplied thereto. More particularly, the modulation and addition section 8 is constructed to introduce thereinto, in the form of carriers, clocks obtained by dividing, through the divider 10 of 1/N, an output of the clock generator 9 which generates reference clocks having a frequency of $f_0$ and to carry out balanced modulation of the clocks.

Figure 2:
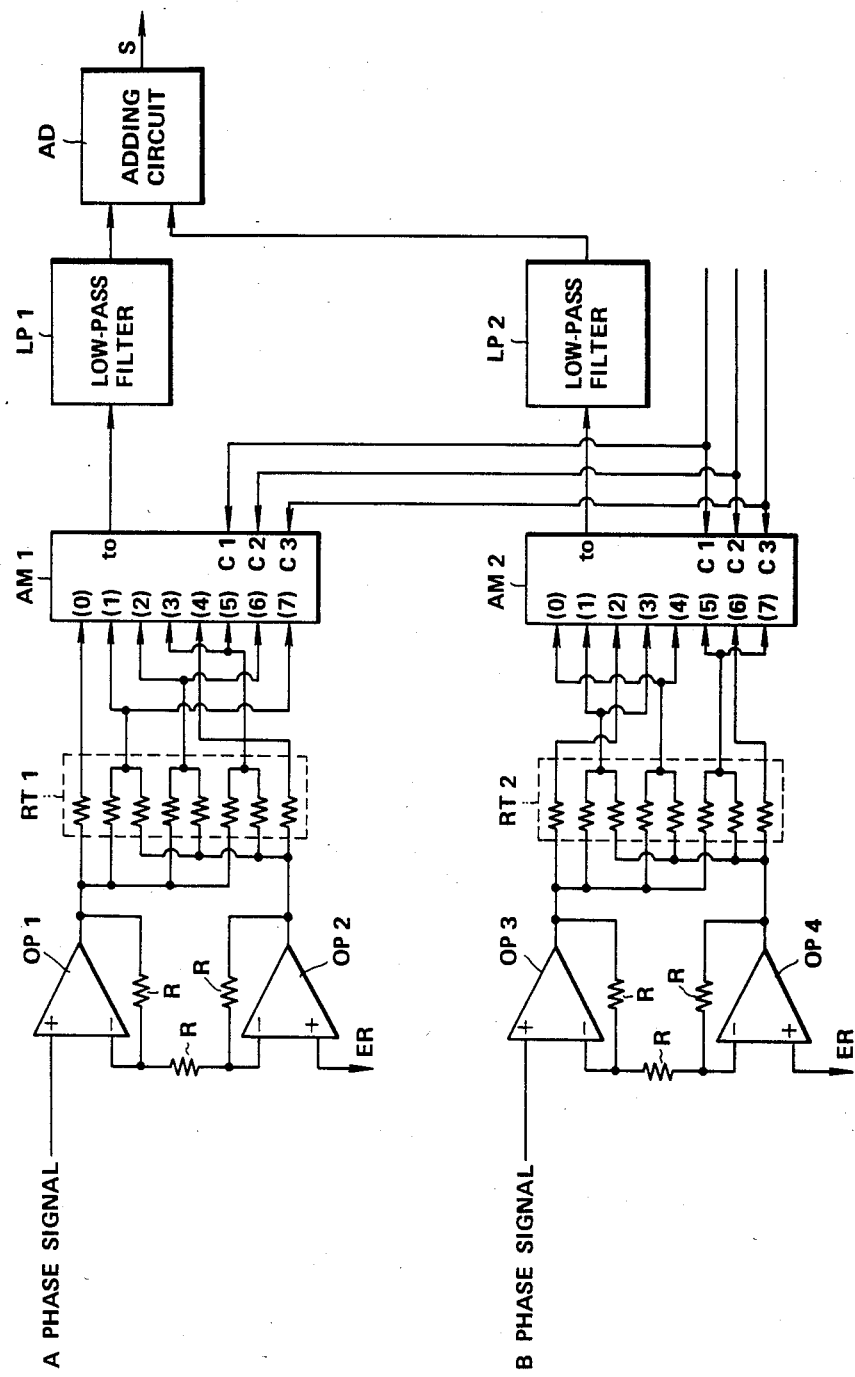
FIG. 2 is a circuit diagram showing a circuit in an essential part of the embodiment of FIG. 1.

An example of the modulation and addition section 8 is illustrated in FIG. 2. First, the A phase signal supplied to the modulation and addition section 8 to provide signals having phases opposite to each other for the purpose of balanced modulation is introduced into operational amplifiers OP1 and OP2, so that a positive phase signal and a negative phase signal may be obtained due to conversion, which are then adjusted to have the same voltage in a resistor network RT1 and supplied to a modulation circuit AM1.

Resistors R provided in relation to the operational amplifiers OP1 and OP2 are input resistors and feedback resistors therefor.

The polytomy or multi-division of the positive and negative phase signals derived from the A phase signal in the example shown in FIG. 2 is for the purpose of decreasing a higher harmonic component of the modulated signal. More particularly, the balanced modulation of the A phase signal ($e_0 \sin 2\pi \cdot x/P$) by means of a carrier of a rectangular wave generally causes a higher harmonic component of odd orders to be contained therein. On the contrary, as in the example of FIG. 2, when one cycle of the carrier is divided into eight parts for the balanced modulation, a higher harmonic component of 3 and 5 orders are suppressed, resulting in only that of 7, 9, --- orders remaining therein. This causes the removal of a higher harmonic component by means of a low pass filter described below to be facilitated.

At this time, the balanced-modulated signal when the carrier is divided into 8 parts is 1, $\frac{1}{2}$, 0, $-\frac{1}{2}$ and $-1$ times as large as the A phase signal, thus, it is required to provide the resistor network RT in order to form voltage therefor.

Figure 3:
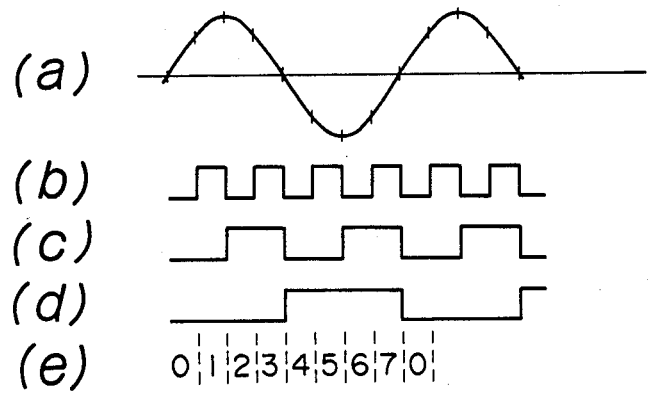
FIG. 3 is a diagrammatic view showing operation of the embodiment of FIG. 1.

The modulation circuit AM1 has input terminals (0) to (7) to which the positive and negative signals of the A phase signal are supplied through the resistor network RT1 and input terminals C1 to C3 to which carriers obtained by subjecting the reference clock to 1/N-division are supplied. The modulation circuit AM1 serves to subsequently switch the A phase signal supplied to the input terminals (0) to (7) by switching operation and leads it to an output terminal $t_0$ and may comprise, for example, an analog multiplexer. The switching of the modulation circuit AM1 is accomplished by means of a carrier supplied to the input terminals C1 to C3. In this instance, in the illustrated embodiment, a carrier and pulses having cycles two and four times as large as the carrier are supplied to the input terminals C1 to C3 to carry out the switching of the input signals supplied to the input terminals (0) to (7) according to octal binary counting operation. More particularly, a carrier shown in FIG. 3(b) and pulses having cycles shown in FIGS. 3 (c) and (d) are supplied to the input terminals C1 to C3 to decode octal numbers of from (0) to (7) as shown in FIG. 3(e) to obtain an octal signal, which is used to carry out the switching of the A phase signal as shown in FIG. 3(a) to obtain a balanced-modulated wave.

Accordingly, a modulated wave signal S of $e_0e_1 \sin(2\pi \cdot x/P)\sin \omega t$ contained in the above described equation (3) is obtained at the output terminal $t_0$. The modulated wave signal S essentially contains a higher harmonic component, which is removed by a low-pass filter LP1.

Likewise, the B phase signal is supplied through operational amplifiers OP3 and OP4 to a modulation circuit AM2. However, input terminals (0) to (7) of the modulation circuit AM2 are supplied thereto signals different in phase by 90° from those supplied to the modulation circuits AM1.

Signals supplied to the input terminals C1 to C3 of the modulation circuit AM2 are the same as those supplied to the modulation circuit AM1. However, the input terminals (0) to (7) are supplied thereto the B phase signal of which a carrier component different in phase by 90° from that in the modulation circuit AM1, accordingly, the modulation circuit AM2 essentially carries out modulation operation of $e_0e_1\cos(2\pi \cdot x/P)\cos \omega t$. This results in a modulated wave of $e_0e_1\cos(2\pi \cdot x/P)\cos \omega t$ contained in the above-described equation (3) being obtained at an output terminal $t_0$ of the modulation circuit AM2.

The so-obtained modulated wave is introduced into a low-pass filter LP2 to remove a higher harmonic component therefrom.

The addition of the modulated waves obtained as described above in an adding circuit AD causes the modulated signal $S = K\cos(\omega t - 2\pi x/P)$ represented by the equation (3) to be obtained. In FIG. 2, reference character ER designates an operation reference power supply for the operational amplifiers.

The modulation and addition section 8 shown in FIG. 2 is adapted to carry out the addition after previously modulating the carriers by means of the corresponding A and B phase signals. This requires to arrange each two such resistor networks, modulation circuits and low-pass filters. However, this should be preferably avoided because suc a low-pass filter is highly expensive and such arrangement causes the circuit to be largesized and complicated in structure. In view of such a respect, the present invention may be so modified that the mixing and dividing of the A and B phase signals in the resistor network and then the modulation and filtering make the arrangement of each only one resistor network, resistor network, modulation circuit and lowpass filter possible.

Figure 4:
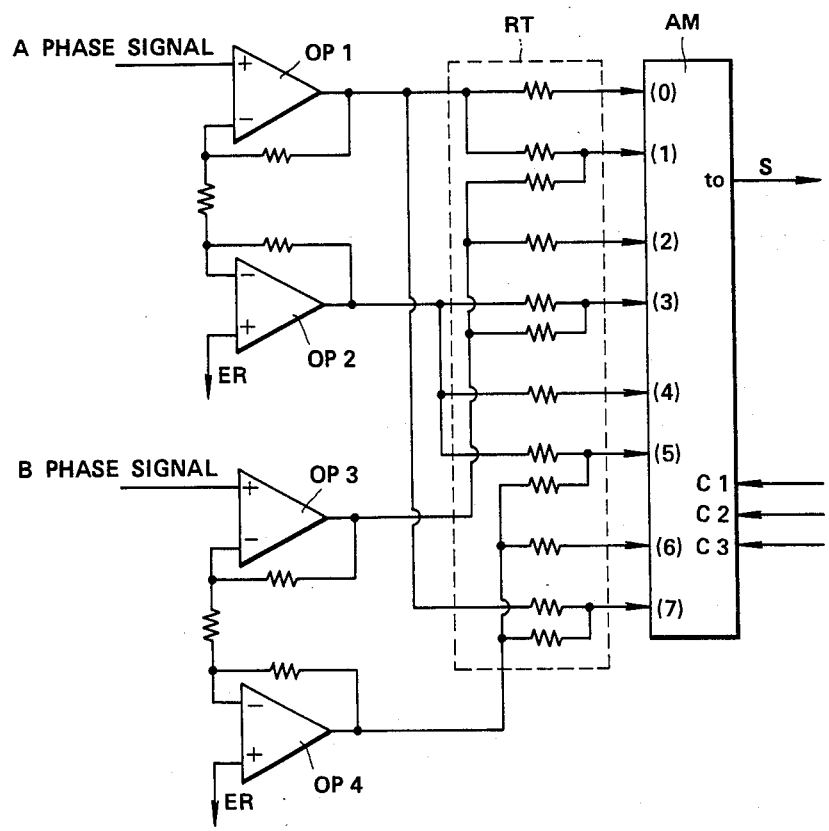
FIG. 4 is a circuit diagram showing a modification of a circuit in an essential part of the embodiment of FIG. 1.

FIG. 4 shows such a modification as described above. More particularly, the modification of FIG. 4 is adapted to carry out the mixing and addition of an A phase signal, an $\overline{A}$ phase signal opposite in phase to the A phase signal, a B phase signal and a $\overline{B}$ phase signal opposite in phase to the B phase signal in a resistor network RT to form a mixture of signals of opposite phases and the same voltage. Then, the signal mixture is supplied to a modulation circuit AM, subjected to switching or balanced modulation by means of pulse signals (FIGS. 3(b) to (d)) supplied to input terminals C1 to C3, and then passed through a low-pass filter LP, so that the same signal as that treated through the circuit of FIG. 2 may be obtained.

Thus, the modulation and addition section 8 has the modulated signal S represented by the equation (3) which contains the deviation x of the scales 1 and 2 as its phase component obtained at the output terminal thereof.

Figure 5:
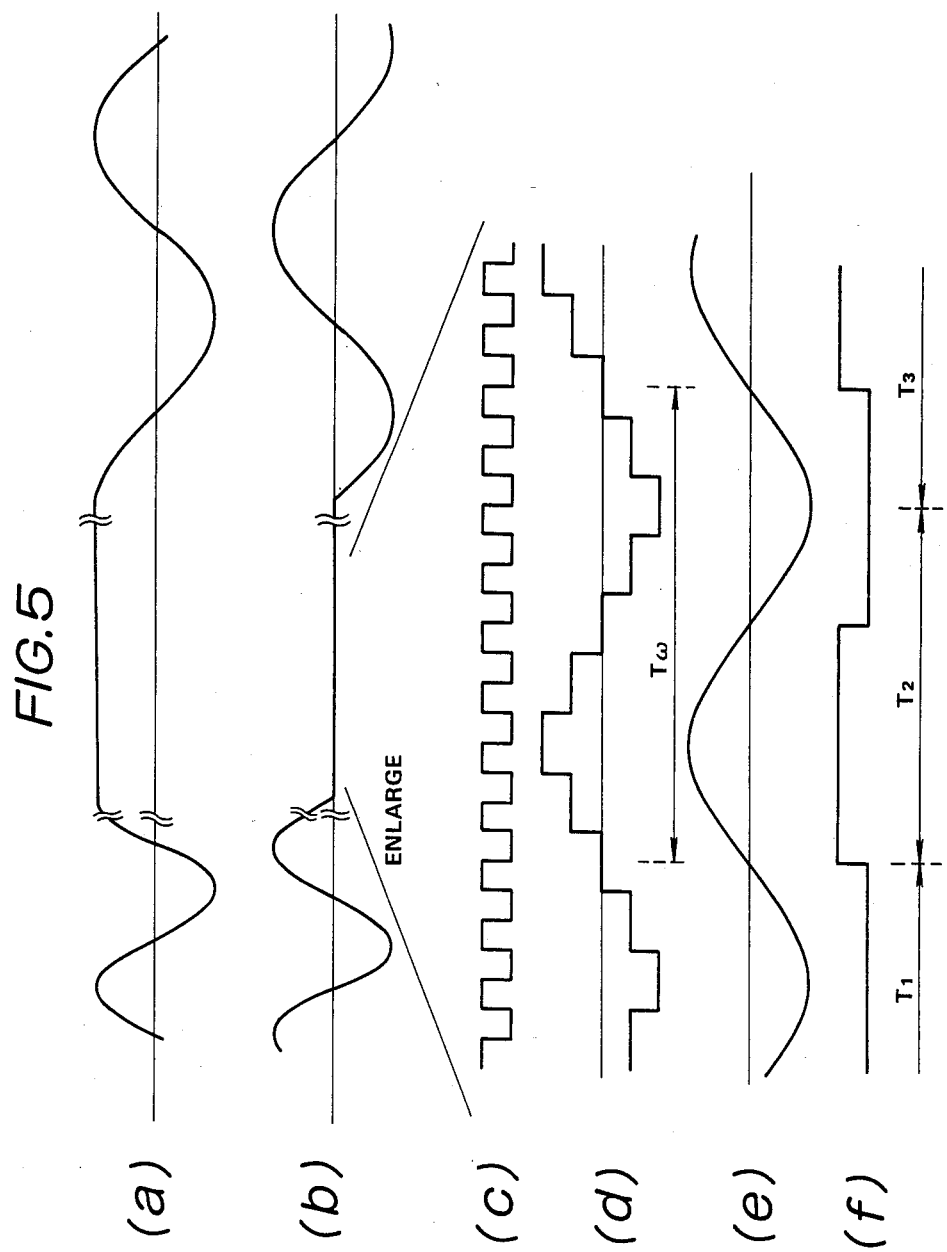
FIGS. 5 and 6 each are a diagrammatic view showing operation of the embodiment of FIG. 1.

Now, the above-described operation will be more detailedly described with reference to FIG. 5.

First, the amplifiers 7A and 7B generate such A and B phase signals as shown in FIGS. 5(a) and 5(b). In FIGS. 5(a) and 5(b), an interval T1 is indicates that the scale 2 is moved in the left direction relative to the scale 1, an interval T2 indicates stop of the scale 2 and an interval T3 indicates the movement of the scale 2 in the right direction relative to the scale 1.

The clock generator 9 shown in FIG. 1 generates such a reference clock of a predetermined cycle (frequency of $f_0$) as shown in FIG. 5(c), which is subjected to 1/N-division by the divider 10 and supplied in the form of carriers to the modulation and addition section 8.

In this instance, an increase in resolution is accomplished by increasing the frequency $f_0$ of the reference clock and increasing the dividing number N. However, it is preferable that the frequency of $f_0$ and the dividing number N are determined to be within a range of several KHz to several MHz and that of several tens to several hundreds, respectively, because of restrictions on the circuit. In FIG. 5, the dividing number is determined to be eight for convenience.

When the carriers obtained by subjecting the reference clock to 1/N division are modulated by means of the A and B phase signals and then subjected to addition, such a modulated signal S as represented by the equation (3) is generated which has constant amplitude $K(=e_0e_1/2)$ and a phase component varied depending upon the deviation x. When the modulated signal S is enlarged in connection with the stopping interval T2, it has such a waveform of $T_w$ in cycle and K in amplitude as shown in FIGURE 5(d).

The deviation x is 0 in the stopping interval T2, accordingly, the phase component in the equation (3) is rendered 0, resulting in $S = K\{\cos\omega t - 1/7\cos 7\omega t - 1/9\cos 9\omega t\}$. This indicates that eight reference clocks are contained in one cycle of the modulated wave.

Likewise, in each of the left movement interval T1 and right movement interval T3, frequency modulation is carried out in amounts corresponding to the deviation x, so that a modulated signal S of which the number of reference clocks contained in one cycle is deviated from 8 may be obtained.

Thus, the modulated wave containing the reference clock component is treated through the low-pass filter LP to remove a higher harmonic component therefrom, which is as shown in FIG. 5(e).

The modulation and addition section 8 generates such a modulated signal S as shown in FIG. 5(e). The signal S is then introduced into the wave shaping section 11 shown in FIG. 1 to be converted to a rectangular wave of $T_w$ in cycle as shown in FIG. 5(f) and then supplied to a subsequent counting section.

The counting section comprises a pulse counter 12, a comparison counter 13, a comparator 14 and a corrective pulse generator 15. The pulse counter 12 is supplied thereto the reference clock from the clock generator 9.

Now, the manner of operation of the counting section subsequent to the pulse counter will be described with reference to FIG. 6.

Figure 6:
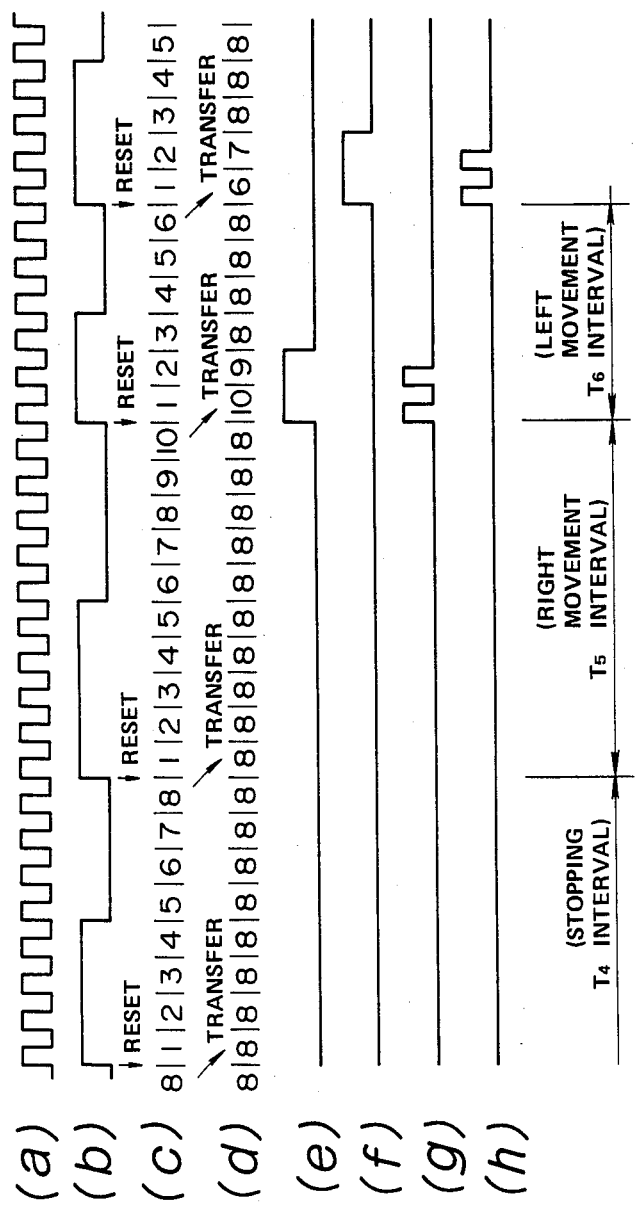
Figure 7:
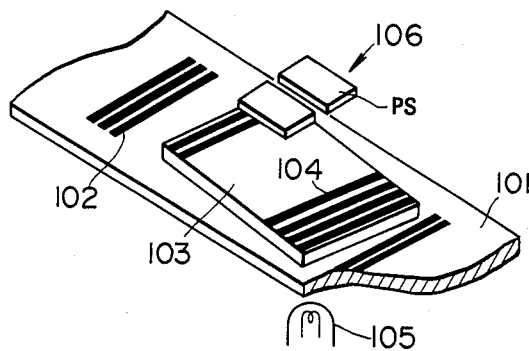
FIG. 7 is a perspective view showing a scale section in the embodiment of FIG. 1.
Figure 8:
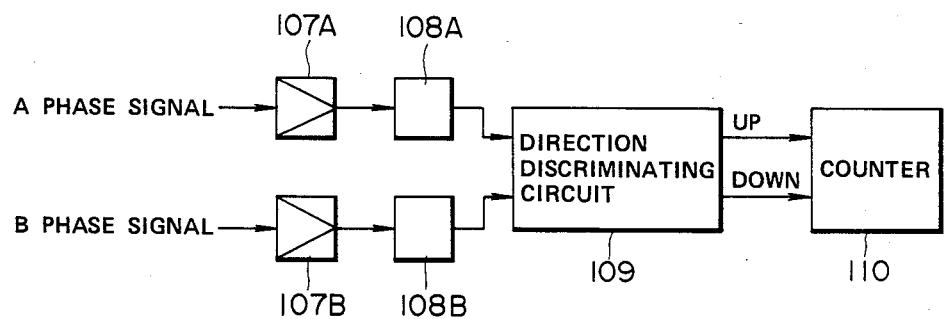
FIG. 8 is a block diagram showing a prior art.

FIG. 6(a) shows the reference clock output from the clock generator 9. In FIG. 6, T4 indicates a stopping interval of each of the scales 1 and 2, T5 indicates a right movement interval and T6 indicates a left movement interval.

The pulse counter 12 detects one cycle of a signal supplied from the wave shaping section 11 and counts reference clocks contained in the one cycle. More specifically, the pulse counter 12 detects the rising of the output of the wave shaping section 11 shown in FIG. 6(b) to start counting of the reference clocks. When eight reference clocks are counted in the stopping interval T4 as shown in FIG. 6(b), the output waveform of the wave shaping section 11 rises again as shown in FIG. 6(b). The pulse counter 12 transfers a resultant counting value shown in FIG. 1 as shown in FIG. 6(d) to reset its counting value as shown in FIG. 6(b). The resetting of the pulse counter 12 may be carried out to prepare a reset signal therein in synchronism with the termination of timing of the transfer to the comparison counter 13. Alternatively, it may be carried out by receiving a reset signal from the comparison counter 13.

The comparison counter 13 comprises a reversible counter which is capable of presetting a counting value and presets the counting value of the pulse counter 12 supplied to a preset terminal ST. In the embodiment of FIG. 6, a counting value of 8 is preset as shown in FIG. 6(d).

Then, a counting value D of the comparison counter 13 is supplied to the comparator 14. In the comparator 14 is previously set a reference value N as an output of a setting section 16. More particularly, the dividing number N of the reference clock (the number of reference clocks contained in one cycle of the modulated wave at x=0 or at the time of stopping of the scales 1 and 2) is previously set as the reference value in the comparator 14, and a comparison between the reference value N and the counting value D is carried out in the comparator. In the illustrated embodiment, the dividing number N of the reference clock is eight, resulting in N=D in the stopping interval T4, thus, no output is generated at output terminals $t_1$ and $t_2$ of the comparator 14.

In the right movement interval T5, the pulse counter 12 counts ten reference clocks from one rising to the next rising in the wave shaped signal from wave shaping section 11 shown in FIG. 1 (FIG. 6(b)). The so-obtained counting value of 10 is transferred to the comparison counter 13, and renewed and held as shown in FIG. 6(d). Accordingly, the counting value D does not coincide with the reference value N in the comparator, resulting in D>N.

In this instance, an output is generated at the output terminal $t_1$ of the comparator 14 as shown in FIG. 6(e).

The corrective pulse generator 15 is supplied thereto the reference clock from the clock generator 9. Supposing that the right movement of the scale is movement in a positive direction, the corrective pulse generator 15 receives the output generated at the output terminal $t_1$ of the comparator 14 to feed the reference clocks subsequently supplied thereto to an upcount terminal UP as shown in FIG. 6(g). An upcount pulse shown in FIG. 6(g) is supplied to a counter section (not shown). This results in the scales 1 and 2 being deemed to be relatively moved in the right direction, so that counting-up of the counting value may be carried out.

As described above, one reference clock is obtained by subjecting the pitch of the moire fringe to N-division and the moire fringe itself is obtained by enlarging the optical lattice of the scales 1 and 2. Accordingly, one reference clock generated from the corrective pulse generator 15 corresponds to a travel obtained by dividing the pitch of the optical lattice into N equal parts.

In the illustrated embodiment, N is eight. Supposing that the pitch of the optical lattice of each of the scales 1 and 2 is 40 μm, the scale section is deemed to be moved by 5 μm (40 μm/8) in the right direction every generation of one reference pulse at the upcount terminal UP of the corrective pulse generator 15. Resolution of such measuring can be increased by increasing the dividing number N. For example, N is set to be 200, resolution of 0.2 μm is realized in a scale having a pitch of 40 μm.

The reference clock generated at the upcount terminal UP of the corrective pulse generator 15 is supplied to the downcount terminal DN of the comparison counter 13, which then carries out downcounting of the reference clock. Accordingly, when two such reference clocks are supplied to the downcount input terminal DN of the comparison counter 13, the comparison counter 13 exhibits a counting value of 8 as shown in FIG. 6(d). This results in D=N also in the comparator 14 to cause the output of the output terminal $t_1$ to be extinguished, to thereby stop the corrective pulse generator 15 from outputting any reference clocks.

Also, in the left movement interval T6, six reference clocks are counted by the pulse counter 12 during one cycle of the wave shaping section 11 as shown in FIG. 6(c), and a counting value of 6 thus obtained is transferred to the comparison counter 13 (FIG. 6(d)). Then, the counting value D of the comparison counter 13 is compared with the reference value N in the comparator 14, resulting in N>D, so that an output may be generated at the output terminal $t_2$ of the comparator 14 (FIG. 6(f)). The corrective pulse generator 15 receives the output of the output terminal $T_2$ to generate a reference clock shown in FIG. 6(h) at the downcount terminal DN and then supplies the reference clock to a counter section (not shown) to measure the left movement of the scale section.

Concurrently, the reference clocks are supplied to the upcount input terminal UP of the comparison counter 13 to carry out upcounting of the counting value D as shown in FIG. 6(d). In this instance, the supply of two such reference clocks leads to D=8, so that the condition of D=N may be satisfied in the comparator 14 to cause the output at the output terminal $t_2$ of the comparator 14 to be extinguished.

Thus, the number of reference clocks during one cycle of the output of the wave shaping section 11 which was counted in the pulse counter 12 is introduced through the comparison counter 13 into the comparator 14, which compares the number with the reference value N to count the difference corresponding to α in the above-described equation (4)). The above-described operation is carried out every cycle of the output of the wave shaping section 11, to thereby measure the movement of the scale section.

Also, in the embodiment, the counting value of the pulse counter 12 is once transferred to the comparison counter 13; and when the comparator 14 detects that the counting value does not coincide with the reference value N, upcount or downcount operation is carried out on the comparison counter 13 until the coincidence between both is obtained. The number of reference clocks for upcounting or downcounting of the comparison counter 13 serves as a pulse for measuring.

Accordingly, it will be noted that the embodiment carries out all treatment in a digital manner, so that accurate measuring operation may be accomplished.

In FIG. 1, reference numeral 17 designates a waveform converting section which is provided depending upon signal treatment of a device using a signal obtained by the measuring device of the embodiment such as, for example, an NC device or the like and adapted to receive the upcount or downcount reference clock or measuring reference clock of the comparison counter 13 generated from the corrective pulse generator 15 to generate A and B phase signals different in phase by 90° from each other.

As can be seen from the foregoing, the measuring device of the present invention is constructed to carry out balanced modulation on the A and B phase signals different in phase by 90° obtained from the scale section by carriers obtained by subjecting the reference clock to 1/N-division and carry out the addition. Thus, the resultant modulated signal is a signal frequency-modulated depending upon the movement of the scale section, which is contained as a phase component therein.

The number of reference clocks contained in one cycle of the modulated signal is compared with the reference value N or the number of reference clocks in the case that the scale section is stopped to obtain a difference therebetween which indicates the phase component of the modulated wave, so that the movement of the scale section may be counted.

Accordingly, an increase in resolution of the measuring is carried out by increasing the frequency of the reference clock and increasing the dividing number N. For example, supposing that the frequency $f_0$ of the reference clock is 8 Mz and the dividing number N is 200, measuring resolution of 1 μm can be obtained even when the pitch of the optical lattice of the scale section is set to be 200 μm which is sufficient to facilitate working.

Also, the present invention realizes resolution of 0.1 μm when scales having an optical lattice of 20 μm in pitch which can be prepared by the prior art are used.

Further, the present invention can extensively facilitate the setting of resolution desired by varying a frequency $f_0$ from the clock generator and a dividing ratio in the divider.

While a preferred embodiment of the invention has been described with a certain degree of particularity with reference to the drawings, obvious modifications and variations are possible in the light of the above teachings. It is therefore to be understood that within the scope of the appended claims, the invention may be practiced otherwise than as specifically described.

What is claimed is:

1. A measuring device two output signals different in phase by 90° generated from a scale section which generates one signal every unit length movement of an object to be measured, to thereby detect the amount and direction of movement of said object, comprising:

a light source for radiating a light of constant level;

a photoelectric transfer section for receiving the light projected from said light source through a scale section which includes a pair of optical scales and for generating two output signals different in phae by 90° due to relative movement of said optical scales;

a carrier generating section for generating a carrier signal having a frequency higher than that of said two output signals of said scale section;

a modulation and addition section for carrying out modulation of said two output signals generated from said scale section by means of said carrier signal generated from said carrier generating section and for carrying out addition of at least said output signals to generate a modulated signal containing the amount of movement of said object as a phase component; and a counting section for counting the number of clocks of a predetermined cycle contained in one cycle of said modulated signal generated from said modulation and addition section.

2. A measuring device as defined in claim 1, wherein said carrier generating section comprises a clock generator for generating a reference clock of a predetermined cycle and a divider fpr dividing said reference clock generated from said clock generator.

3. A measuring device as defined in claim 1 or 2, wherein said counting section comprises a pulse counter for counting the number of said reference clocks contained in one cycle of said modulated signal generated from said modulation and addition section and a comparison section for comparing a value counted by said pulse counter with a reference value.

4. A measuring device as defined in claim 3, wherein said comparison section comprises a comparison counter comprising a reversible counter in which said value counted by said pulse counter is preset, a comparator for comparing said counted value with sai reference value and a corrective pulse generator for supplying said reference clock as an upcount pulse or downcount pulse to said comparison counter depending upon a comparison result obtained in said comparator.

5. A measuring device as defined in claim 4, wherein said reference value is the number of divisions of said divider.

* * * * *